United States Patent [19]
Pedersen et al.

[11] Patent Number: 5,830,952
[45] Date of Patent: Nov. 3, 1998

[54] WATER-DISPERSIBLE POLYMER AND COATING COMPOSITION CONTAINING THE SAME

[75] Inventors: Walter R. Pedersen; Joseph Devasia Ponmankal, both of Chicago, Ill.

[73] Assignee: The Dexter Corporation, Windsor Locks, Conn.

[21] Appl. No.: 603,885

[22] Filed: Feb. 22, 1996

[51] Int. Cl.$^6$ .................................................. C08F 283/00
[52] U.S. Cl. ...................... 525/531; 523/423; 525/529; 525/530
[58] Field of Search .................... 525/531, 529, 525/530; 523/423

[56] References Cited

U.S. PATENT DOCUMENTS

| | | | |
|---|---|---|---|
| 3,943,187 | 3/1976 | Wu | 260/837 R |
| 3,997,694 | 12/1976 | Wu | 428/35 |
| 4,021,395 | 5/1977 | Wu | 260/29.6 NR |
| 4,183,869 | 1/1980 | Bilow | 260/573 |
| 4,212,776 | 7/1980 | Martinez et al. | 523/423 |
| 4,212,781 | 7/1980 | Evans et al. | 260/29.4 UA |
| 4,247,439 | 1/1981 | Matthews et al. | 260/29.6 NR |
| 4,302,373 | 11/1981 | Steinmetz | 260/29.3 |
| 4,308,185 | 12/1981 | Evans | 260/29.2 EP |
| 4,355,122 | 10/1982 | Fan | 523/423 |
| 4,374,875 | 2/1983 | Fan | 427/386 |
| 4,444,923 | 4/1984 | McCarty | 523/406 |
| 4,446,258 | 5/1984 | Chu et al. | 523/406 |
| 4,480,058 | 10/1984 | Ting et al. | 523/404 |
| 4,585,813 | 4/1986 | Brown et al. | 523/409 |
| 4,638,038 | 1/1987 | Salensky | 525/533 |
| 4,954,553 | 9/1990 | Johnson et al. | 524/376 |
| 4,963,602 | 10/1990 | Patel | 523/403 |
| 5,242,996 | 9/1993 | Yamada et al. | 525/502 |
| 5,296,525 | 3/1994 | Spencer | 523/408 |

FOREIGN PATENT DOCUMENTS

| | | |
|---|---|---|
| 0 469 646 A1 | 2/1992 | European Pat. Off. . |
| 1 720 922 | 1/1968 | Germany . |
| 1720922 | 1/1968 | Germany . |
| WO 92/14763 | 9/1992 | WIPO . |

OTHER PUBLICATIONS

J.T.K. Woo et al., "Synthesis and Characterization of Water–Reducible Graft Epoxy Copolymers," *J. Coat. Tech.*, 54(689) (1982), PP. 41–55.

R.N. Johnson et al., "Water–Borne Phenoxy Resins Low VOC Coatings with Excellent Toughness, Flexibility and Adhesion," Water–Borne and Higher–Solids Coating Symposium, Feb. 3–5, 1988, New Orleans, LA, pp. 443–461.

*Primary Examiner*—Melvyn I. Marquis
*Assistant Examiner*—D. Aylward
*Attorney, Agent, or Firm*—Marshall, O'Toole, Gerstein, Murray & Borun

[57] ABSTRACT

A water-dispersible polymer and a coating composition containing the water-dispersible polymer are disclosed. The water-dispersible polymer is prepared from: (a) an epoxy compound having about two epoxy groups, such as an epoxy resin, (b) a linking compound having (i) conjugated carbon—carbon double bonds or a carbon—carbon triple bond and (ii) a moiety capable of reacting with an epoxy group, such as sorbic acid, and (c) acrylic monomers, at least a portion of which are capable of rendering the polymer water dispersible, such as acrylic acid, wherein the epoxy portion (a) of the polymer is covalently linked to the polymerized acrylic portion (c) by linking compound (b). The coating composition contains the water-dispersible polymer, a fugitive base to solubilize the polymer, a curing agent, and a carrier containing water.

19 Claims, No Drawings

WATER-DISPERSIBLE POLYMER AND COATING COMPOSITION CONTAINING THE SAME

FIELD OF THE INVENTION

The present invention relates to water-dispersible polymers and to coating compositions for metal substrates containing the water-dispersible polymers. The coating composition comprises a water-dispersible polymer, a fugitive base, a curing agent, and a carrier comprising water and a volatile organic solvent. The water-dispersible polymer is prepared from: (a) an epoxy compound having about two epoxy groups, (b) a linking compound having (i) conjugated carbon-carbon double bonds or a carbon-carbon triple bond and (ii) a moiety capable of reacting with an epoxy group, and (c) acrylic monomers, wherein the epoxy portion (a) of the polymer is covalently linked to the polymerized acrylic portion (c) by the linking compound (b).

BACKGROUND OF THE INVENTION

It is well known that an aqueous solution in contact with an untreated metal substrate can result in corrosion of the untreated metal substrate. Therefore, a metal article, such as a metal container for a water-based product, like a food or beverage, is rendered corrosion resistant in order to retard or eliminate interactions between the water-based product and the metal article. Conventionally, corrosion resistance is imparted to the metal article, or to a metal substrate in general, by passivating the metal substrate, or by coating the metal substrate with a corrosion-inhibiting coating.

Investigators continually have sought improved coating compositions that reduce or eliminate corrosion of a metal article and that do not adversely affect an aqueous product packaged in the metal article. For example, investigators have sought to improve the imperviousness of the coating in order to prevent corrosion-causing ions, oxygen molecules, and water molecules from contacting and interacting with a metal substrate. Imperviousness can be improved by providing a thicker, more flexible and more adhesive coating, but often, improving one particular advantageous coating feature is achieved at the expense of another advantageous coating feature.

In addition, practical considerations limit the thickness, adhesive properties and flexibility of a coating applied to a metal substrate. For example, thick coatings are expensive, require a longer cure time, can be esthetically unpleasing, and can adversely affect the process of stamping and molding the coated metal sub-strate into a useful metal article. Similarly, the coating should be sufficiently flexible such that the continuity of the coating is not destroyed during stamping and molding of the metal substrate into the desired shape of the metal article.

Investigators also have sought coatings that possess chemical resistance in addition to corrosion inhibition. A useful coating for the interior of a metal container must be able to withstand the solvating properties of a product packaged in the metal container. If the coating does not possess sufficient chemical resistance, components of the coating can be extracted into the packaged product and adversely affect the product. Even small amounts of extracted coating components can adversely affect sensitive products, like beer, by imparting an off-taste to the product.

Conventionally, organic solvent-based coating compositions were used to provide cured coatings having excellent chemical resistance. Such solvent-based compositions include ingredients that are inherently water insoluble, and thereby effectively resist the solvating properties of water-based products packaged in the metal container. However, because of environmental and toxicological concerns, and in order to comply with increasingly strict governmental regulations, an increasing number of coating compositions are water based. The water-based coating compositions include ingredients that are water soluble or water dispersible, and, therefore, cured coatings resulting from water-based coating compositions often are more susceptible to the solvating properties of water.

Epoxy-based coatings and polyvinyl chloride-based coatings have been used to coat the interior of metal containers for foods and beverages because these coatings exhibit an acceptable combination of adhesion to a metal substrate, flexibility, chemical resistance, and - corrosion inhibition. However, epoxy-based coatings and polyvinyl chloride-based coatings have serious disadvantages that investigators still are attempting to over-come.

For example, coatings based on polyvinyl chloride or related halide-containing vinyl polymers, like polyvinylidene chloride, possess the above-listed advantageous properties of chemical resistance and corrosion inhibition, and are economical. However, curing a polyvinyl chloride or related halide-containing vinyl polymer can generate toxic monomers, such as vinyl chloride, a known carcinogen. In addition, the disposal of a halide-containing vinyl polymer, such as by inciner- ation, also can generate toxic monomers. The generated vinyl chloride thereby poses a potential danger to workers in metal can manufacturing plants, in food processing and packaging plants, and at disposal sites. Disposal of polyvinyl chloride and related polymers also can produce carcinogenic dioxins and environmentally harmful hydrochloric acid. Government regulators, therefore, are acting to eliminate the use of polyvinyl chloride-based coating compositions that contact food, and thereby eliminate the environmental and health concerns associated with halide-containing vinyl polymers.

To overcome these environmental concerns, epoxy-based coating compositions recently have been used to coat the interior of food and beverage containers. However, epoxy-based coatings also possess disadvantages. For example, epoxy-based coating compositions are more expensive than polyvinyl chloride-based coating compositions.

Various patents disclose waterborne coating compositions for metal cans. In general, prior patents disclose coating compositions including waterborne thermoset resins for use as can coatings. The thermoset resins can be formulated with a crosslinking agent to provide crosslinked films during cure, as demonstrated by the resistance of the cured coating to the effects of organic solvents such as methyl ethyl ketone. The cured thermoset resins often do not have sufficient flexibility for use as can coatings.

Recently, waterborne phenoxy resins were disclosed as useful in coatings for metal cans. These waterborne phenoxy resins are high molecular weight thermoplastic resins that are difficult to process and are too expensive for practical commercial use. In addition, because these phenoxy resins are thermoplastic resins, cured coatings derived therefrom are not resistant to organic solvents, although the cured coatings often provide sufficient barrier properties to water-based compositions for use as can coatings.

Investigators, therefore, have sought a waterborne coating composition for the interior of food and beverage containers that retains the advantageous properties of adhesion, flexibility, chemical resistance and corrosion inhibition, and that is economical and does not adversely affect the food and beverages packaged in the container.

Investigators prefer a thermosetting coating composition because such compositions are easier to handle and provide better chemical resistance than thermoplastic coating compositions. A thermosetting coating composition also requires a crosslinking agent, generally a phenolic resin, an aminoplast, or a similar resin, in order to provide a cured coating having a sufficient molecular weight.

Prior investigators have studied waterborne epoxy resin-based compositions for application to metal substrates. Many of these investigators sought epoxy resin-based aqueous compositions that provide a suffi- ciently flexible cured coating such that the coated metal substrate can be deformed without destroying film continuity. Often, conventional epoxy resins provide a rigid cured film thereby making it difficult to impossi- ble to coat the metal substrate prior to deforming, i.e., shaping, the metal substrate into a metal article, like a metal can. Coating a metal substrate prior to shaping the metal substrate is a standard industrial practice.

For example, Johnson et al. U.S. Pat. No. 4,954,553 discloses an aqueous coating composition comprising a carboxyl-bearing phenoxy resin and a resin that is soft in comparison to the phenoxy resin, like a polyester. The carboxyl-bearing phenoxy resin is prepared by grafting ethylenically unsaturated monomers to the phenoxy resin. The coating composition provides flexible cured coatings. Fan U.S. Pat. Nos. 4,355,122 and 4,374,875 disclose a waterborne phenolic composition wherein an ethylenically unsaturated monomer including a carboxyl group is grafted onto a phenoxy resin by standard free radical polymerization techniques, then the carboxyl groups are neutralized by a base.

Chu et al. U.S. Pat. No. 4,446,258 discloses an aqueous coating composition comprising: (1) the neutralized reaction product of an epoxy resin with a preformed addition polymer containing carboxyl groups, and (2) an acrylic or vinyl polymer, which is prepared either in situ or added to the composition, and which is different from the preformed addition polymer.

Evans et al. U.S. Pat. No. 4,212,781 discloses grafting an acrylic monomer or monomer blend to an epoxy resin to provide a polymeric blend including unreacted epoxy resin, an acrylic resin and a graft polymer of the acrylic resin and epoxy resin. Steinmetz U.S. Pat. No. 4,302,373 discloses a waterborne coating composition consisting essentially of the neutralized reaction product of a modified polyepoxide (e.g., an ester or ether) or a phenolic and a carboxyl-functional polymer.

Patel U.S. Pat. No. 4,963,602 discloses aqueous coating compositions including an epoxy resin, an acrylic resin, a phenoxy resin, a novolac resin, and a resol resin. Wu U.S. Pat. Nos. 3,943,187 and 3,997,694 disclose an organic solvent-based coating composition consisting essentially of a blend of an acrylic polymer having hard and soft segments and an epoxy resin. Salensky U.S. Pat. No. 4,638,038 discloses modified phenoxy resins wherein anhydrides or polycarboxylic acids are grafted onto a phenoxy resin. Spencer U.S. Pat. No. 5,296,525 discloses (a) the reaction product of an epoxy resin with a monomer having unsaturated groups, (b) wherein the reaction product of (a) then is reacted with a preformed carboxyl-functional polymer and a tertiary amine, (c) followed by reacting the reaction product of (b) with unsaturated monomers in an emulsion polymerization.

Other patents that disclose epoxy resins admixed with acrylic resins, or having acrylic resins grafted thereon, include Matthews et al. U.S. Pat. No. 4,247,439; Evans et al. U.S. Pat. No. 4,308,185; Wu U.S. Pat. No. 4,021,396; McCarty U.S. Pat. No. 4,444,923; Brown et al. U.S. Pat. No. 4,585,813; and Ting et al. U.S. Pat. No. 4,480,058.

Publications disclosing a water-based coating compositions including an epoxy resin and an acrylic resin include:

J. T. K. Woo et al., "Synthesis and Characterization of Water-Reducible Graft Epoxy Copolymers," *J. Coat. Tech.*, 54 (1982), pp. 41–55; and R. N. Johnson et al., "Water-Borne Phenoxy Resins Low VOC Coatings with Excellent Toughness, Flexibility and Adhesion," presented at the Water-Borne and Higher-Solid Coatings Symposium, Feb. 3–5, 1988 in New Orleans, La.

The above-identified patents and publications disclose waterborne coating compositions comprising an epoxy resin and an acrylic resin. The patents and publications do not disclose a waterborne coating composition comprising a water-dispersible polymer comprising an epoxy resin covalently linked to an acrylic resin by a linking compound having conjugated carbon—carbon double bonds or a triple bond.

The present coating compositions, after curing, demonstrate: (1) excellent flexibility; (2) excellent adhesion; and (3) excellent chemical resistance and corrosion inhibition.

SUMMARY OF THE INVENTION

The present invention is directed to waterborne coating compositions that, after curing, effectively inhibit corrosion of a metal substrate; do not adversely affect products packaged in a container having an interior surface coated with the cured composition; and exhibit excellent flexibility, chemical resistance and adhesion. The coating compositions effectively inhibit corrosion of ferrous and nonferrous metal substrates when the composition is applied to a surface of the metal substrate, then cured for a sufficient time and at a sufficient temperature to provide a crosslinked coating. A coating composition of the present invention can be used both on the interior and exterior of can ends and can bodies, and on metal closures for food containers.

A present coating composition overcomes disadvantages associated with prior epoxy resin-based compositions and comprises:

(a) a water-dispersible polymer prepared from
  (i) an epoxy compound having about two epoxy groups, like an epoxy resin;
  (ii) a linking compound having
    (A) either conjugated carbon—carbon double bonds or a carbon—carbon triple bond, and
    (B) a moiety capable of reacting with an epoxy group; and
  (iii) acrylic monomers, at least a portion of which are capable of rendering the polymer water dispersible, wherein the polymer has at least one epoxy group and the epoxy portion (i) of the polymer is covalently linked to the polymerized acrylic portion (iii) by linking compound (ii);

(b) a fugitive base, like a tertiary amine;

(c) a curing agent; and (d) a carrier comprising water and a volatile organic solvent.

In particular, the present coating compositions comprise:

(a) about 5% to about 60%, by weight of nonvolatile material, of a water-dispersible polymer;

(b) a sufficient amount of a fugitive base to render the water-dispersible polymer water dispersible; and (c) about 0.5% to about 25%, by weight of nonvolatile material, of a curing agent, like a phenolic resin or an aminoplast.

The water-dispersible polymer incorporated into the coating composition is prepared from (i) an epoxy compound, (ii) a linking compound having an activated unsaturated carbon-carbon bond moiety and a moiety capable of reacting with an epoxy group, and (ii) acrylic monomers, at least some of which are capable of rendering the polymer water dispersible. As used here and through-out the specification, the term "an activated unsaturated carbon—carbon bond moiety" is defined as either conjugated carbon—carbon double bonds or a carbon—carbon triple bond.

The epoxy compound has about two epoxy groups, i.e., about 1.5 to about 2.5 epoxy groups per molecule of epoxy compound, and an epoxy equivalent weight (EEW) of about 180 to about 20,000, and is present in an amount of about 5% to about 95% by weight of the polymer. The linking compound having an activated unsaturated carbon—carbon bond moiety and a moiety capable of reacting with an epoxy group is present in a sufficient amount to react with at least about 1% (i.e., about 1% or more) and up to about 50% of the epoxy groups provided by the epoxy compound. Alternatively stated, the linking compound is present in an amount of about 0.1% to about 5% by weight of the epoxy compound, or about 0.003% to about 4% by weight of the water-dispersible polymer.

The polymerized acrylic monomers are present in an amount of about 5% to about 95% by weight of the polymer. At least 5% by weight of the polymerized acrylic monomers have a moiety, like a carboxylic acid or amide moiety, that render the polymer water dispersible. The polymer contains about 0.25% to about 20% by weight of polymerized acrylic monomers having a moiety capable of imparting water dispersibility. The polymerized acrylic monomer portion of the polymer also can include 0% up to about 95% by weight of vinyl monomers, like styrene. The polymerized acrylic monomer portion of the polymer also can include 0% up to about 3% by weight of monomers having more than one vinyl group, like divinyl-benzene.

The water-dispersible polymer, therefore, has the general structural formula:

wherein E is the epoxy resin portion of the polymer, L is the linking portion of the polymer, and A is the polymerized acrylic portion of the polymer. The polymer is rendered water dispersible by adding a base, e.g., a fugitive base, to the polymer.

The epoxy portion of the water-dispersible polymer provides adhesion, and crosslinking capabilities for mar, chemical, and corrosion resistance. The acrylic portion of the water-dispersible polymer provides flow, wetting, and hardness properties, and provides the hydrophilicity that is necessary to disperse the water-dispersible polymer in water. Linking the epoxy and acrylic portions provides enhanced flexibility and resistance properties to the water-dispersible polymer. The water-dispersible polymer, therefore, exhibits the excellent flexibility and formability required in a can coating, and exhibits improved chemical resistance properties.

Components (a) through (c) of the coating composition are dispersed in an aqueous carrier such that a coating composition includes about 5% to about 50%, and preferably about 10% to about 50% of nonvolatile components, by weight of the total composition. Other optional components, such as a pigment, a filler, or an additive to enhance composition esthetics or performance, also can be included in the composition, and accordingly increase the weight percent of total nonvolatile material in the composition to above about 60% by weight of the total coating composition. The carrier of the coating composition also includes a volatile organic solvent to assist in dispersing or emulsifying composition ingredients or to improve application of the coating composition to a substrate. A coating composition typically includes about 15% to about 35% by weight of a volatile organic solvent.

As used here and hereinafter, the term "coating composition" is defined as a coating composition including a water-dispersible polymer, a fugitive base, a curing agent, and any other optional ingredients dispersed in the carrier. The term "cured coating composition" is defined as an adherent polymeric coating resulting from curing a coating composition.

A coating composition, after application to a metal substrate, and subsequent curing at a sufficient temperature for a sufficient time, provides an adherent layer of a cured coating composition that effectively inhibits corrosion; exhibits excellent flexibility and adhesion to the metal substrate; and does not adversely affect a product, like a food or beverage, that contacts the cured coating composition. Because of these advantageous properties, a cured coating composition can be used to coat the interior of food and beverage containers and overcome the disadvantages associated with conventional polyvinyl chloride-based compositions and epoxy-based compositions. A cured coating composition comprises the water-dispersible polymer and the curing agent essentially in the amounts these ingredients are present in the coating composition, expressed as nonvolatile material. The fugitive base is expelled, or removed, from a coating composition during the cure cycle.

In accordance with another important aspect of the present invention, a cured coating composition demonstrates excellent flexibility, product resistance, and adhesion to a metal substrate compared to prior epoxy/acrylic resin-based coatings. The excellent adhesion of a cured coating composition to a metal substrate improves the corrosion-inhibiting properties of the coating composition. The excellent flexibility of a cured coating composition facilitates processing of the coated metal substrate into a coated metal article, like in molding or stamping process steps, such that the cured coating composition remains in continuous and intimate contact with the metal substrate. A cured coating composition also exhibits excellent chemical resistance, is sufficiently hard to resist scratching, and does not adversely affect a food or beverage packaged in a container having an interior surface coated with the cured coating composition.

In accordance with another important aspect of the present invention, a coating composition provides a cured coating composition that overcomes the disadvantages of prior epoxy/acrylic-based coatings and of conventional polyvinyl chloride-based coatings used to coat the interior of containers for food and beverages. In addition, a present coating composition can be used on both the interior and exterior of can bodies and can ends, and on closures, thereby obviating the need for a container manufacturer to use multiple coating compositions.

These and other aspects and advantages of the present invention will become apparent from the following detailed description of the preferred embodiments.

DETAILED DESCRIPTION OF THE PREFERRED EMBODIMENTS

The coating compositions of the present invention, after curing, provide cured coating compositions that effectively inhibit the corrosion of metal substrates, such as, but not limited to, aluminum, iron, steel and copper. The cured coating compositions, after curing, also demonstrate excellent adhesion to the metal substrate; excellent chemical resistance and scratch resistance; and excellent flexibility.

In general, a coating composition of the present invention comprises: (a) a water-dispersible polymer, (b) a fugitive base, and (c) a curing agent in (d) a carrier comprising water and organic solvents. In addition, the present coating compositions can include optional ingredients, like lubricants, that improve the esthetics of the composition, that facilitate processing of the composition, or that improve a functional property of the composition. The individual composition ingredients are described in more detail below.

(a) The Water-Dispersible Polymer

The water-dispersible polymer is prepared from: (i) an epoxy compound having about two epoxy groups, (ii) a linking compound having an activated unsaturated carbon—carbon bond moiety and a moiety capable of reacting with an epoxy group, and (iii) acrylic monomers, at least a portion of which are capable of rendering the polymer water dispersible. The linking compound (ii) provides a covalent link between the epoxy compound (i) and the polymerized acrylic monomers (iii).

In accordance with an important feature of the present invention, the water-dispersible polymer is present in the coating composition in an amount of about 5% to about 60%, and preferably about 10% to about 50%, by weight of nonvolatile material.

As demonstrated hereafter, the epoxy portion of the water-dispersible polymer imparts adhesion properties, and chemical and mar resistance, to a cured coating composition. The acrylic portion of the water-dispersible polymer provides the functionality necessary to disperse the polymer in water and also imparts flow, hardness, and wetting properties. Flexibility and chemical resistance of the cured coating composition is improved over previous epoxy/acrylate-based compositions because a water-dispersible polymer having covalently linked epoxy and acrylic portions is present in the coating composition. The cured coating composition exhibits the advantageous properties of a combination of an epoxy resin and an acrylic resin, with the added advantage that the epoxy and acrylic portions of the polymer are covalently linked.

The flexibility of a cured coating composition is an important feature because the coating composition then can be applied to a metal substrate, and cured, prior to shaping the metal substrate into a metal article, such as a can end, a can body, or a closure. The flexibility imparted to a cured coating composition overcomes rigidity problems associated with prior epoxy-based compositions. The chemical and mar resistance of the cured composition are important properties with respect to resisting scratching of the cured coating composition during manufacture into a metal article and to resisting the corrosive effects of materials packaged in the metal article.

The water-dispersible polymer is prepared from the epoxy compound, the linking compound, and acrylic monomers. These components are reacted to provide a water-dispersible polymer having an EEW of about 360 to about 20,000, and preferably about 1,000 to about 12,000. The water-dispersible polymer has a weight average molecular weight ($M_w$) of about 35,000 to about 75,000, and preferably about 45,000 to about 65,000; and a number average molecular weight ($M_n$) of about 6,000 to about 25,000, and preferably about 7,000 to about 16,000.

The individual components of the water-dispersible polymer are described in more detail below.

(i) Epoxy Compound Having About Two Epoxy Groups

An epoxy compound having about two epoxy groups is present in an amount of about 5% to about 95%, and preferably from about 10% to about 90%, by weight of the water-dispersible polymer. To achieve the full advantage of the present invention, the epoxy compound is present in an amount of about 15% to about 85% by weight of the water-dispersible polymer.

During preparation of the water-dispersible polymer, a portion of the epoxy groups provided by the epoxy compound are consumed in a reaction with the linking compound. However, as discussed hereafter, the epoxy compound, after modification by reaction with the linking compound, contains at least one epoxy group.

The epoxy compound contains an average of about 1.5 to about 2.5 epoxy groups per molecule of epoxy compound. If the average number of epoxy groups exceeds about 2.5, excessive crosslinking of the composition can result in a cured coating that is too hard or brittle. The epoxy compound has an EEW of about 180 to about 20,000, and preferably about 1,000 to about 12,000. To achieve the full advantage of the present invention, the epoxy compound has an EEW of about 2,000 to about 8,500.

The epoxy compound imparts chemical and mar resistance to the cured coating composition. If the epoxy compound is present in an amount below about 5% by weight of the water-dispersible polymer, the cured coating composition is brittle and can form cracks or lose adhesion during manufacture of a metal article. In addition, crosslinkable moieties are present in an insufficient amount to achieve proper cure of coating. If the epoxy-containing compound is present in an amount above about 95% by weight of the water-dispersible polymer, the cured coating composition does not have sufficient flow and wetting properties, and dispersion of the polymer in water is increasingly difficult. Within the above weight ranges, the cured coating composition is sufficiently flexible to permit deformation of a cured coating composition without forming cracks, and is sufficiently hard to exhibit excellent chemical and mar resistance.

The epoxy compounds having about two epoxy groups typically is a linear epoxy resin terminated at each molecular end of the resin with an epoxy group. The epoxy compounds having about two epoxy groups, therefore, average about 1.5 to about 2.5 epoxy groups per molecule of epoxy compound.

The epoxy compound can be an aliphatic epoxy compound or an aromatic epoxy compound. The preferred epoxy compounds are aromatic, like epoxy resins based on the diglycidyl ether of bisphenol A. The epoxy compound has an EEW of about 180 to about 20,000, and preferably about 1,000 to about 12,000. The epoxy compounds have a weight average molecular weight (Mw) of about 400 to about 50,000. An epoxy compound can be used in its commercially available form, or can be prepared by advancing a low molecular weight epoxy compound by standard methods well known to those skilled in the art, e.g., advancing an epoxy compound having an EEW of about 180 to about 500 with bisphenol A to produce an epoxy compound having an EEW of about 1,000 to about 12,000.

Exemplary epoxy compounds include, but are not limited to, DER 664, DER 667, DER 668, and DER 669, all available from Dow Chemical Co., Midland, Mich., and EPON 1004, EPON 1007, and EPON 1009, all available from Shell Chemical Co., Houston, Tex. An exemplary low molecular weight epoxy compound that used in its commercial form, or can be advanced with bisphenol A, is EPON 828, available from Shell Chemical Co.

In general, suitable epoxy compounds are aliphatic-, cycloaliphatic-, or aromatic-based epoxy resins, such as, for example, epoxy resins represented by structural formulae I and II:

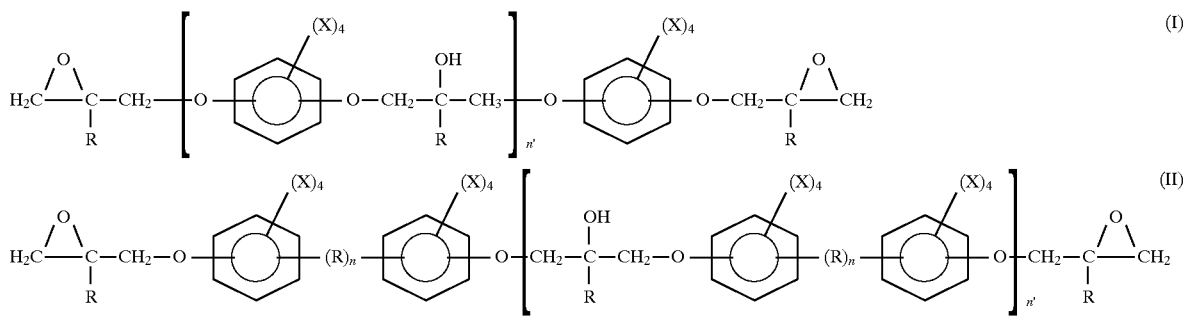

wherein each A is, independently, a divalent hydrocarbyl group having 1 to about 12, preferably 1 to about 6, and most preferably 1 to about 4, carbon atoms; each R is, independently, hydrogen or an alkyl group having 1 to about 3 carbon atoms; each X is, independently, hydrogen, a hydrocarbyl or hydrocarbyloxy group having 1 to about 12, preferably 1 to about 6, and most preferably 1 to about 4, carbon atoms, or a halogen atom, preferably chlorine or bromine; n is 0 or 1, and n' has an average value of 0 to about 150, and preferably 0 to about 100.

In particular, the preferred epoxy resins are the (diglycidyl ether/bisphenol-A) resins, i.e., polyether diepoxides prepared by the polymeric adduction of bisphenol-A (III)

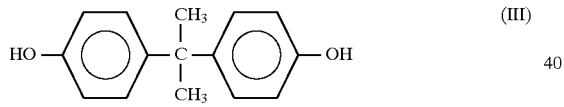

and the diglycidyl ether of bisphenol-A (IV).

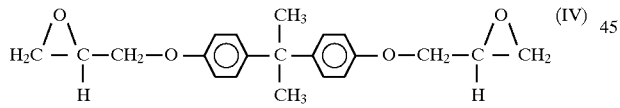

The diglycidyl ether can be preformed by reacting two molecules of epichlorohydrin with one molecule of the bisphenol-A in the presence of a base, such as sodium hydroxide. Preferably, however, this reaction is carried out in such a manner that the resulting diglycidyl ether molecules react in situ with bisphenol molecules to produce the epoxy resin.

In this case, the epoxy resin is a mixture including polymeric species corresponding to different values of n' in the following idealized formula V:

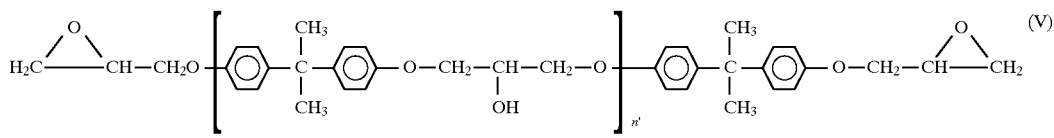

wherein n' is a number from 0 to about 150.

In addition to bisphenol-A, useful epoxy resins can be prepared by advancing a diglycidyl ether of a bisphenol listed below with an exemplary, but nonlimiting, bisphenol listed below:

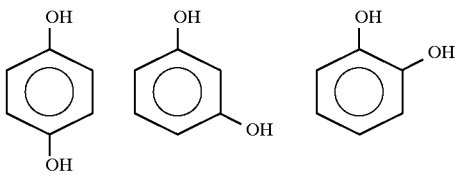

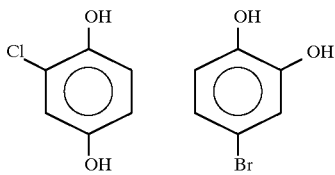

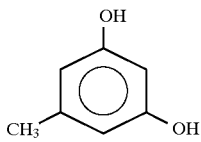

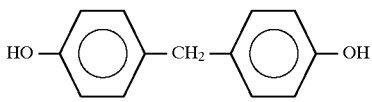

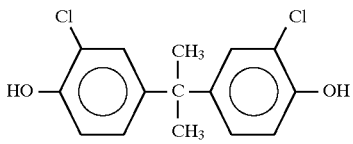

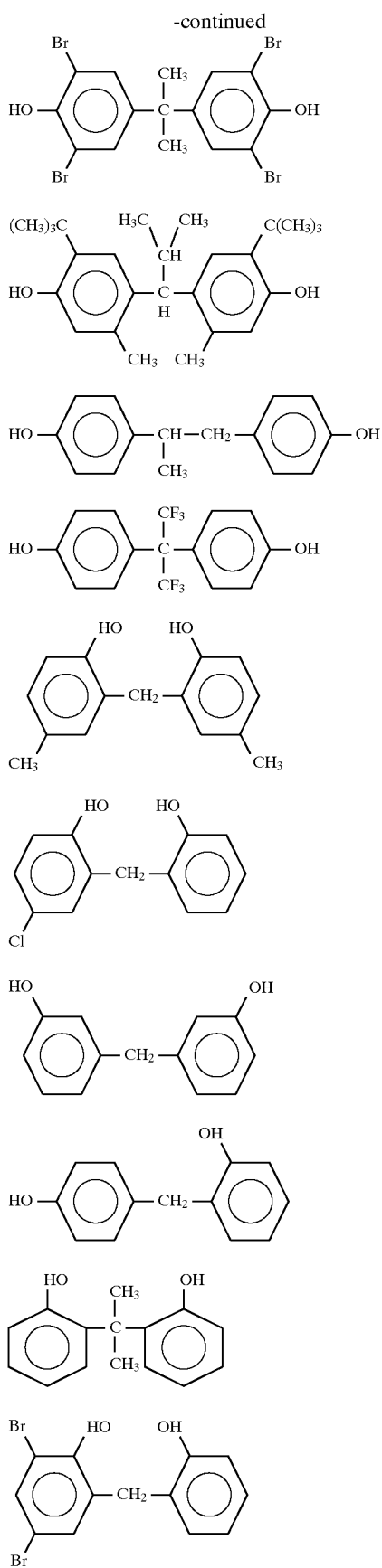
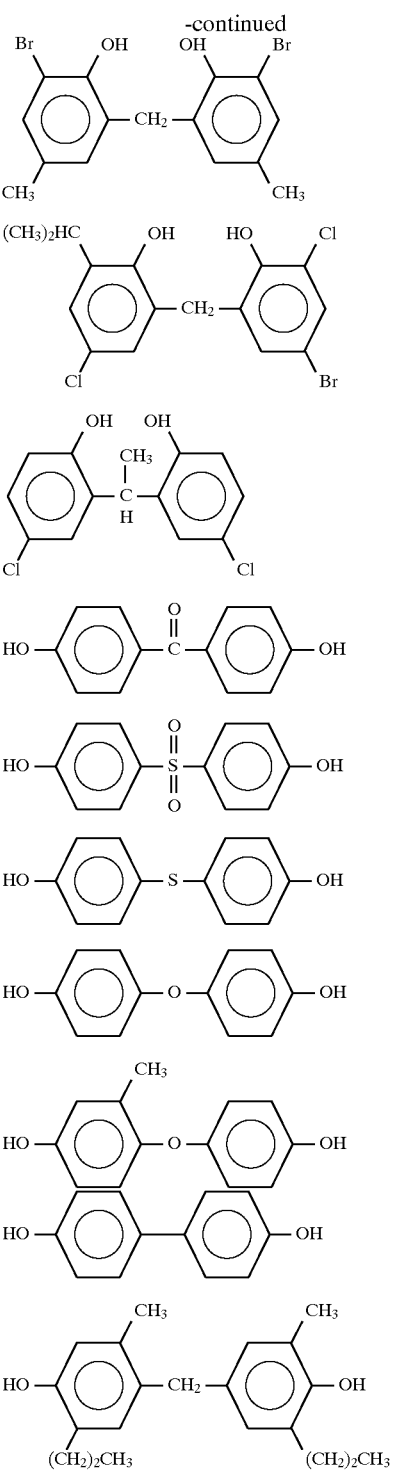
Other epoxy resins that can be used as a component of the water-dispersible polymer are prepared from the following starting epoxy-containing materials. These epoxy-containing materials are reacted with bisphenol-A or another bisphenol to adjust the molecular weight of the epoxy compound to a sufficiently high range.
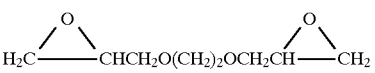

13

-continued

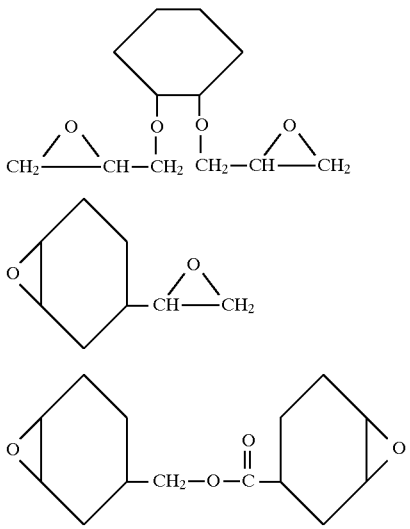

(ii) Linking Compound Having an Activated Unsaturated Carbon—Carbon Bond Moiety and a Moiety Capable of Reacting with an Epoxy Group The linking compound used to prepare a water-dispersible polymer has two functional groups and covalently links the epoxy portion of the water-dispersible polymer to the polymerized acrylic monomer portion of the polymer. The linking compound is present in the water-dispersible polymer in an amount of about 0.0030%. to about 4%, and preferably about 0.003% to about 2.5%, by weight of the water-dispersible polymer.

In accordance with another important feature of the present invention, the linking compound is present in a sufficient amount to react with at least 1% and up to about 50% of the epoxy groups provided by the epoxy compound. Preferably, the linking compound is present in a sufficient amount to react with about 5% to about 40%, and most preferably about 50 to about 25%, of the epoxy groups provided by the epoxy compound. Accordingly, a reaction between the epoxy compound and the linking compound does not consume all the epoxy groups, and sufficient epoxy groups remain such that the water-dispersible polymer contains at least one epoxy group.

As previously stated, the linking compound is a bifunctional monomer. One functionality is a moiety capable of reacting with an epoxy group. The second functionality is a moiety having an activated unsaturated carbon—carbon bond. As used herein, the term "activated unsaturated carbon—carbon bond" refers to a carbon—carbon triple bond, i.e., an acetylenic bond, or to conjugated carbon—carbon double bonds.

The linking compounds have the general structural formulae VI or VII

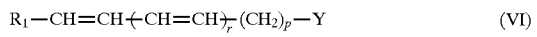

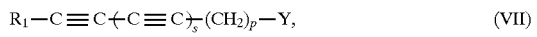

wherein $R_1$ is hydrogen, an aliphatic hydrocarbyl group, an aliphatic cyclohydrocarbyl group, or an aromatic hydrocarbyl group; r is a numeral from 1 to 6; s is a numeral from 0 to 6; p is a numeral from 0 to 18; and Y is a moiety capable

14 of reacting with an epoxy group. Preferably, the linking compound has a maximum of twelve carbon atoms.

In particular, $R_1$ can be an aromatic hydrocarbyl group, like phenyl, or a substituted aromatic hydrocarbyl group, like a $C_1$–$C_{10}$ alkoxy-substituted phenyl, a halo-substituted phenyl, or a $C_1$–C18 alkyl-substituted phenyl. As used herein, the term "halo" includes fluoro, chloro, bromo, and iodo. The $R_1$ group also can be an aliphatic hydrocarbyl group or an aliphatic cyclohydrocarbyl group, either substituted or unsubstituted. Nonlimiting examples of $R_1$ are hydrogen; a $C_1$ to $C_{18}$ alkyl group, and preferably a $C_1$–$C_{10}$ alkyl group; a $C_5$ to $C_7$ cycloalkyl group; a phenyl-substituted $C_1$–$C_{18}$, alkyl or $C_5$–$C_7$ cycloalkyl group; and a halo-substituted alkyl or cycloalkyl group. The $R_1$ group also can be an unsaturated $C_1$ to $C_{18}$ aliphatic hydrocarbyl group or an unsaturated $C_5$ to $C_7$ cycloaliphatic hydrocarbyl group, i.e., the group contains one or more carbon—carbon double bonds or carbon—carbon triple bonds. Such unsaturated aliphatic hydrocarbyl and cyclohydrocarbyl groups can be substituted or unsubstituted. Any substituent groups on $R_1$ are sufficiently nonreactive such that the substituents do not interfere in the preparation of the modified epoxy compound or the water-dispersible polymer. To achieve the full advantage of the present invention, $R_1$ is hydrogen, a $C_1$–$C_4$ alkyl group, a $C_5$–$C_7$ cycloalkyl group, or phenyl.

The identity of the Y group is not limited, except that the Y group is capable of reacting with an epoxy group. Therefore, the Y group can be, but is not limited to, carboxyl (—$CO_2H$), amido (—$CON(R_2)_2$), amino (—$N(R_2)_2$), hydroxyl (—OH), or mercapto (—$SR_3$), wherein $R_2$ groups are, independently, hydrogen, $C_1$–$C_4$ alkyl, or phenyl, and $R_3$ is hydrogen, $C_1$–$C_4$ alkyl, or phenyl.

Specific linking compounds include, but are not limited to, sorbic acid, sorbic alcohol, dicyclopentadiene acids, conjugated unsaturated fatty acids (e.g., eleostearic acid), 3-pentyn-1-ol, 2-pentyn-1-ol, 4-pentynoicacid, 4-pentyn-1-ol, 4-pentyn-2-ol, 1-pentyn-3-ol, heptacose-10,12-diynoicacid, heptadeca-2,4-diynoic acid, heneicosa-2,4-diynoic acid, 2-heptynoic acid, 2-hexynoic acid, nonacosa-10,12-diynoic acid, nonadeca-1,4-diynoic acid, 2-nonynoic acid, pentadeca-2,4-diynoic acid, pentacosa-10, 12-diynoic acid, phenylpropiolic acid, propiolic acid, tetrolic acid, tricosa-10,12-diynoic acid, 10-undecynoic acid, 1-butyn-3-ol, 2-butyn-l-ol, 3-butyn-l-ol, 2-decyn-l-ol, 3-decyn-l-ol, 3,6-dimethyl-1-heptyn-3-ol, 3,5-dimethyl-l-hexyn-3-ol, 3,4-dimethyl-1-pentyn-3-ol, 3-ethyl-l-heptyn-3-ol, 4-ethyl-l-hexyn-3-ol, 3-ethyl-5-methyl-l-heptyn-3-ol, 4-ethyl-l-octyn-3-ol, 3-ethyl-l-pentyn-3-ol, l-ethynyl-l-cyclohexanol, 1-heptyn-3-ol, 2-heptyn-l-ol, 3-heptyn-1-ol, 4-heptyn-2-ol, 5-heptyn-3-ol, 1-hexyn-3-ol, 2-hexyn-l-ol, 3-hexyn-l-ol, 4-hexyn- 2-ol, 5-hexyn-1-ol, 5-hexyn-3-ol, 3-methyl-1-butyn-3-ol, 5-methyl-l-hexyn-3-ol, 3-methyl-l-pentyn-3-ol, 3-nonyn-l-ol, 1-octyn-3-ol, 3-octyn-l-ol, 1-phenyl-2-propyn-l-ol, 2-propyn-1-ol, 10-undecyn-l-ol, 3-aminophenylacetylene, propargylamine, and mixtures thereof. A preferred linking compound is sorbic acid, having the structure (VIII).

(iii) Acrylic Monomers

The acrylic monomers, after polymerization, are present in an amount of about 5% to about 95%, and preferably about 10% to about 90%, by weight of the water-dispersible polymer. To achieve the full advantage of the present invention, the polymerized acrylic monomers are present in an amount of about 15% to about 85%, by weight of the water-dispersible polymer.

The acrylic monomers are polymerized in a free radical polymerization reaction, in the presence of the linking compound, to covalently bond the acrylic portion of the water-dispersible polymer to the linking compound through the activated unsaturated carbon—carbon bond moiety. Preferably, the acrylic monomers are polymerized in the presence of the linking compound after the linking compound has been covalently bound to the epoxy compound.

In accordance with an important feature of the present invention, at least a portion of the acrylic monomers are capable of rendering the polymer dispersible in water. These monomers are defined as monomers that yield either water-soluble homopolymers or homopolymers that are rendered water soluble by neutralization with a base. The acrylic monomers can include 0% up to about 95%, by total weight of monomers, of vinyl monomers. To avoid excessive branching, the amount of polyvinyl monomers is 0 % to about 3% by total weight of monomers.

The acrylic monomer typically comprises an α,β-unsaturated carboxylic acid. The α-β unsaturated carboxylic acid renders the polymer water dispersible after neutralization with a base. Suitable α,β-unsaturated carboxylic acid monomers include, for example, acrylic acid, methacrylic acid, crotonic acid, itaconic acid, maleic acid, mesaconic acid, citraconic acid, sorbic acid, fumaric acid, and mixtures thereof. The acrylic monomer also can include acrylamide or methacrylamide which can render the polymer water dispersible.

The α,β-unsaturated carboxylic acid conventionally is copolymerized with a vinyl or an acrylic monomer, like styrene or an acrylic acid ester. Polymerizable vinyl and acrylic monomers suitable for copolymerization with an α,β-unsaturated carboxylic acid include, for example, aromatic and aliphatic compounds including vinyl moieties and esters and amides of α,β-unsaturated carboxylic acids. Non-limiting examples of suitable vinyl and acrylic monomers include styrene and halostyrenes; isoprene; conjugated butadiene; α-methylstyrene; vinyl toluene; vinyl naphthalene; the methyl, ethyl, propyl, isopropyl, butyl, isobutyl, pentyl, isoamyl, hexyl, ethylhexyl, lauryl, and other $C_4$–$C_{12}$ alkyl acrylates, methacrylates and crotonates; dimethyl maleate, dibutyl fumarate and similar diesters of α,β-unsaturated di-carboxylic acids; and mixtures thereof. Other suitable polymerizable vinyl monomers include vinyl chloride, acrylonitrile, methacrylonitrile, vinyl acetate, vinyl propionate, vinyl stearate, isobutoxymethyl acrylamide, and the like.

The preferred acrylic monomers are methyl acrylate, methyl methacrylate, ethyl acrylate, butyl acrylate, acrylic acid, methacrylic acid, and mixtures thereof. A preferred vinyl monomer is styrene. The most preferred acrylic and vinyl monomers are styrene, methacrylic acid, acrylic acid, and mixtures thereof.

The acrylic monomers are polymerized and covalently bonded to the linking compound by subjecting the acrylic monomers and the linking compound to free radical polymerization conditions known to persons skilled in the art. Therefore, the acrylic monomers are polymerized and covalently bonded to the linking compound in the presence of a free radical initiator. Useful free radical initiators include, but are not limited to, redox initiators, peroxide-type catalysts, like, for example, cumene hydroperoxide, or azo compounds, like, for example, azobisisobutyrontrile.

In general, any free radical initiator can be used in preparing the water-dispersible polymer. One commonly used, and preferred, free radical initiator is potassium persulfate. In addition to potassium persulfate, other useful free radical polymerization catalysts include, but are not limited to, redox initiators, such as a sulfite or bisulfite of an alkali metal, ammonium sulfite, ammonium metabisulfate, ammonium bisulfite, a persulfate of an alkali metal or ammonium persulfate; a peroxy compound, such as a peroxide or a peroxy acid, like t-butyl hydroperoxide, di-t-butyl hydroperoxide, benzoyl hydroperoxide, t-butyl peroxide, lauroyl peroxide, methyl ethyl ketone peroxide, chlorobenzoyl peroxide, t-butyl perbenzoate, t-butyl peroxy isopropyl carbonate, and peroxy-3,3, 5-trimethylcyclohexane, or a mixture thereof. Also useful are free radical thermal initiators such as azobisisobutyronitrile; 4-t-butylazo-4'-cyanovaleric acid; 4,4'-azobis-(4-cyanovaleric acid); 2,2'-azobis(2-amidinopropane)-dihydrochloride;2,2'-azobis(2,4-dimethylvaleronitrile); dimethyl 2,2'-azobisisobutyrate; 2,2'-azodimethyl bis(2,4-dimethylvaleronitrile); (1-phenylethyl)-azodiphenylmethane; 2,2'-azobis(2-methylbutyronitrile); 1,1'-azobis(1-cyclohexanecarbonitrile); 2-(carbamoylazo)-isobutyronitrile; 2,2'-azobis(2,4,4-trimethylpenta-2-phenylazo-2,4-dimethyl-4-methoxy)valeronitrile; 2,2'-azobis(2-methylpropane); 2,2'-azobis(N,N'dimethylene-isobutyramidine)dihydrochloride; 4,4'-azobis(4-cyanopentanoic acid); 2,2'-azobis(2-methyl-N-[1,1-bis (hydroxymethyl)-2-hydroxyethyl] propionamide); 2,2'-azobis(2-methyl-N-[1,1-bis(hydroxymethyl)ethyl]propionamide); 2,2'-azobis[2-methyl-N(2-hydroxyethyl)propionamide]; 2,2'-azobis(isobutyramide) dihydrate, and the like. These types of initiators, redox, peroxy, and thermal, can be used singly or in a suitable mixture.

The water-dispersible resin is prepared either by reacting the linking compound with an epoxy compound or by advancing a low molecular weight epoxy compound to a desired EEW while simultaneously reacting the advanced epoxy resin with the linking compound, followed by polymerizing the acrylic monomer in the presence of the linking compound bonded to the epoxy compound. The preferred method simultaneously advances a low molecular weight epoxy compound while reacting the advanced epoxy compound with the linking compound.

For purposes of illustrating the preparation of a water-dispersible polymer, the following experiments and reactions were performed.

First, the ability of a linking compound to covalently bond to an epoxy group without disrupting the activated unsaturated carbon—carbon bond moiety of the linking compound was demonstrated by reacting 1, 2-epoxy-3-phenoxypropane (IX) with sorbic acid (VIII) to provide compound (X).

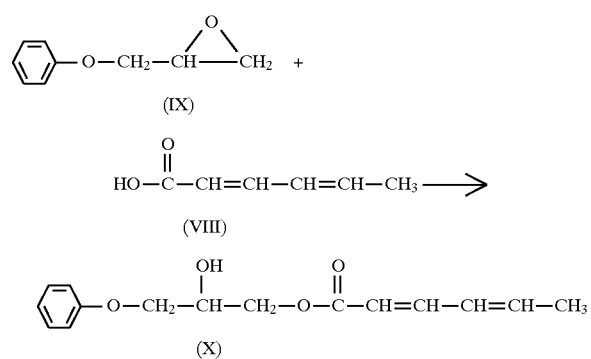

In particular, compound (X) was prepared by admixing 74.0 gram (g) (0.49 equivalents) of compound IX, 55.3g (0.49 equivalents) of sorbic acid, 0.006g (500 ppm) tetraethylammonium bromide (TEAB), and 20g methyl ethyl ketone in a reaction flask to form a reaction mixture. The initial acid number of the reaction mixture was about 184.1. A blanket of nitrogen gas ($N_2$) was applied over the reaction mixture, then the reaction mixture was heated to 200° F., and held at 200° F. until the acid number was reduced to less than one. During the reaction, a second portion of 0.06g TEAB as added to the heated reaction mixture. After the acid number dropped below one, the reaction mixture was cooled, and the methyl ethyl ketone was stripped from the reaction mixture to provide compound (X). The structure of compound (X) was confirmed by nuclear magnetic resonance (NMR) spectroscopy.

In experiments wherein sorbic acid was reacted with an advanced epoxy resin (e.g., EEW of about 1,000), the reaction mixture often was too viscous to completely dissolve the advanced epoxy resin and allow a homogeneous reaction with the sorbic acid. To overcome this problem, sorbic acid (VIII) and bisphenol-A (III) were admixed with a low molecular weight epoxy compound, and allowed to react simultaneously with the epoxy compound. The structure of the resulting epoxy-sorbate polymer was confirmed by NMR spectroscopy. The conjugated diene portion of sorbic acid was not effected during the reaction. The sorbate-modified epoxy compound, therefore, has the structure (XI).

In addition, the epoxy ring of a modified epoxy compound can be opened with a hydroxyl-containing compound having the structure $R_5OH$, wherein $R_5$ is an alkyl group or a hydroxyalkyl group having one to six carbon atoms, or $R_5$ is phenyl. Opening the epoxy ring with an alcohol provides an $\alpha$-hydroxy ether at a terminal end of the modified epoxy compound.

Furthermore, the epoxy ring of the modified epoxy compound can be opened with phosphoric acid having the structure (XIII),

wherein the R6 groups are, independently, hydrogen, an alkyl group or a hydroxyalkyl group having one to six carbon atoms, or phenyl. Opening the epoxy ring with a phosphoric acid of structure (XIII) provides an $\alpha$-hydroxy phosphate ester having the structure (XIV)

at the terminal end of the modified epoxy compound (XI).

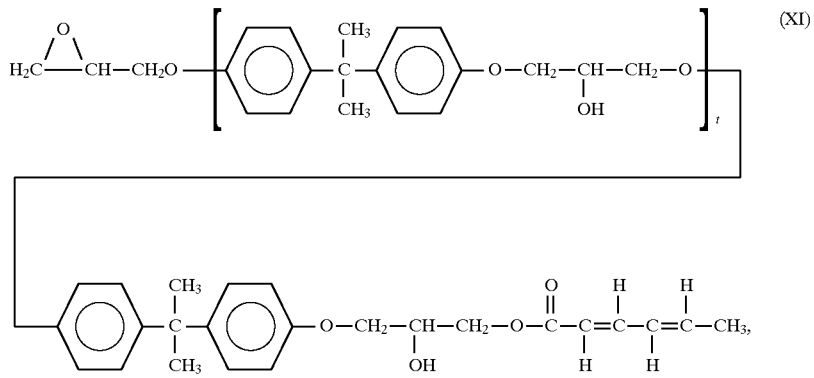

wherein t is 0 to about 70. The sorbate-modified epoxy compound (XI), therefore, has epoxy groups available for reaction with a crosslinking agent and an activated unsaturated carbon—carbon bond moiety available for reaction with the acrylic monomers.

In other embodiments, the epoxy ring remaining in sorbate-modified epoxy compound (XI) is opened prior to reacting the sorbate-modified epoxy compound with the acrylic monomers. For example, the epoxy ring in compound (XI) can be hydrolyzed to provide the corresponding $\alpha$-glycol compound, wherein the epoxy ring at the terminal end of the sorbate-modified epoxy compound is converted to structure (XII).

Similarly, the epoxy ring of compound (XI) can be opened with a nitrogen compound having the structure $(R_4)_2NH$, wherein the $R_4$ groups are, independently, hydrogen, phenyl, or an alkyl or hydroxyalkyl group having one to six carbon atoms. Examples of such nitrogen compounds are ammonia, a primary amine, or a secondary amine. Opening the epoxy ring with a nitrogen compound provides an $\alpha$-aminoalcohol at a terminal end of the modified epoxy compound (XI).

To demonstrate that the linking compound copolymerizes with the acrylic monomers, sorbic acid was reacted with acrylic monomers and vinyl monomers under free radical polymerization conditions. The conjugated diene moiety of sorbic acid was not observed in the resulting polymer. In particular, the following example demonstrates the copolymerization of sorbic acid, acrylic monomers, and vinyl monomers.

| Ingredient | Amount (wt) |
| --- | --- |
| (a) Butyl Cellosolve | 316 g |
| (b) n-Butyl Alcohol | 96 g |
| (c) Styrene | 5.1 g |
| (d) Ethyl Acrylate | 113.4 g |
| (e) Methyl Methacrylate | 33.9 g |
| (f) Acrylic Acid | 21.3 g |
| (g) Methacrylic Acid | 25.5 g |
| (h) Sorbic Acid | 3 g |
| (i) 2,2'-Azobisisobutyronitrile | 3 g |
| (j) Butyl Cellosolve | 50 g |
| (k) 2,2'-Azobisisobutyronitrile | 1.3 g |
| (l) 2,2'-Azobisisobutyronitrile | 1.3 g |
| (m) 2,2'-Azobisisobutyronitrile | 1.3 g |

Ingredients (a) and (b) were charged into a reaction flask and heated to 230° F. Ingredients (c) through (i) were premixed, then added dropwise to the heated mixture of (a) and (b) over a 90-minute period, with agitation and while maintaining a temperature of 230°–235° F. Residual amounts of the monomer premix (c) - (i) were washed into the reaction flash with ingredient (j). The resulting reaction mixture was held at 230° F. for 30 minutes, then ingredient (k) was added. After another 30-minute hold at 230° F., ingredient (1) was added. After a third 30-minute hold at 230° F, ingredient (m) was added. The reaction mixture then was held at 230° F. for an additional 60 minutes, then allowed to cool.

The solvents were evaporated from the reaction mixture, and the resulting copolymer was assayed by NMR for the presence of the sorbic acid diene moiety. No evidence of a diene moiety was observed.

As illustrated hereafter, a sorbate-modified epoxy compound of structural formula (XI) was reacted with acrylic and vinyl monomers to provide a water-dispersible polymer. The resulting water-dispersible polymer had the structure:

wherein E is the epoxy portion of the polymer, A is the acrylic portion, and L is the linking portion which covalently links E to A.

(b) The Fugitive Base

The water-dispersible polymer contains a sufficient amount of acrylic monomers capable of rendering the polymer dispersible in water. These acrylic monomers typically are α,β-unsaturated carboxylic acids and these monomers render the polymer water dispersible by neutralizing the carboxylic acid moiety with a fugitive base.

A fugitive base is included in a sufficient amount such that about 20% to about 100% of the carboxylic acid groups of the acrylic portion of the water-dispersible monomer are neutralized. An excess amount of fugitive base does not adversely affect the coating composition, but the excess amount of fugitive base provides no advantages and, therefore, is wasted. A fugitive base preferably is present in an amount sufficient to neutralize at least about 35% to about 75% of the carboxylic acid groups present in a waterborne coating composition. The precise amount of fugitive base added to the composition is determined from the acid number of the water-dispersible polymer and from the basicity of fugitive base.

A fugitive base is a relatively volatile compound that is expelled from a coating composition during cure. Accordingly, a coating composition, during cure, reverts to a more water insoluble form and, therefore, provides a cured coating composition that exhibits excellent chemical resistance and excellent blush resistance.

A fugitive base usually is a primary, secondary or tertiary amine, either aromatic or aliphatic, or a primary, secondary or tertiary alkanolamine, or ammonium, an alkylammonium hydroxide, or an arylammonium hydroxide, or mixtures thereof. Nonlimiting examples of a fugitive base include ammonium hydroxide, a tetraalkylammonium hydroxide, wherein an alkyl group has one to about 4 carbon atoms (e.g., tetramethylammonium hydroxide), monoethanolamine, dimethylamine, methyldiethanolamine, benzylamine, diisopropylamine, methylethanolamine, butylamine, piperazine, dimethylethanolamine, diethylethanolamine, diethanolamine, morpholine, N-methylmorpholine, N-ethylmorpholine, triethylamine, 2-dimethylamine-2-methyl-1-propanol, diisopropanolamine, trimethylamine, N-methylpiperidine, 2-amino-2-methyl-1-propanol, piperidine, pyridine, dimethylaniline, and similar amines and alkanolamines, and mixtures thereof.

(c) The Curing Agent

A coating composition of the present invention also includes a curing agent, such as a phenolic resin or an aminoplast. The coating composition contains about 0.5% to about 25%, and preferably about 1% to about 20%, by weight of nonvolatile material of the curing agent. To achieve the full advantage of the present invention, the coating composition contains about 1% to about 10%, by weight, of a curing agent.

The curing agent can be a phenolic resin, an aminoplast, a carbodiimide, or a similar curing agent. The phenolic resin is a condensation product resulting from a reaction between a phenol and formaldehyde, and has a low weight average molecular weight of about 800 to about 8,000, and preferably about 1,200 to about 5,000. Phenol or essentially any other compound including a hydroxyphenyl moiety can be used as the phenol component of the phenolic resin. Nonlimiting examples of suitable phenol compounds include phenol, cresylic acid and bisphenol A. Bisphenol A is the preferred phenol component of the phenolic resin.

Similarly, an aminoplast can be used as the curing agent. An aminoplast generally is a low molecular weight partially or fully alkylated condensation product, like urea-formaldehyde, melamine-formaldehyde, and benzoguanamine-formaldehyde resins.

Commercially available aminoplasts include, for example, CYMEL 301, CYMEL 303, CYMEL 370, and CYMEL 373, all being melamine-based and commercially available from American Cyanamid, Stamford, Conn., e.g., CYMEL 301 is hexamethoxymethyl melamine.

Other examples of aminoplast resins are of the type produced by the reaction of aldehyde and formoguanamine, ammeline, 2-chloro-4,6-diamine-1,3,5' triazine; 2- phenyl-p-oxy-4,6-diamino-1,3,5-triazine; and 2,4,6-triethyl-triamino-1,3,5-triazine. The mono-, di, or triaryl melamines, for instance, 2,4, 6-triphenyltriamine-1,3,5-triazine, are preferred. Other aldehydes used to react with the amino compound to form the resinous material are crotonic aldehyde, acrolein, or compounds which generate aldehydes, such as hexamethylenetetramine, paraldehyde, and the like.

(d) The Carrier

The carrier of a present coating composition is water based, but also can include a volatile organic solvent. In general, the volatile organic solvents included in the coating composition have sufficient volatility to evaporate essentially entirely from the coating composition during the curing process, such as during heating at about 350° F. to about 500° F. for about 6 seconds to about 15 minutes.

The volatile organic solvents are included as a portion of the carrier to help dissolve, disperse and emulsify composition ingredients, and thereby provide a more stable composition. The volatile organic solvents also are included to improve the physical properties of the composition, like surface tension, flow out during the bake and viscosity, and thereby provide a composition that is easier to apply and that provides a more uniform cured coating. The volatile organic solvents improve the flow properties of a coating composition and facilitates spraying of a coating composition.

Numerous volatile organic solvents can be included in a present coating composition. Suitable volatile organic solvents have a sufficiently low vapor pressure to resist evaporation during storage and a sufficiently high vapor pressure to be evaporated from the coating composition during cure. Exemplary, nonlimiting volatile organic solvents include, but are not limited to, the methyl, ethyl, propyl, butyl, hexyl or phenyl ether of ethylene glycol, diethylene glycol, triethylene glycol, propylene glycol or dipropylene glycol; ethylene glycol methyl ether acetate; ethylene glycol ethyl ether acetate; ethylene glycol butyl ether acetate; diethylene glycol ethyl ether acetate; diethylene glycol butyl ether acetate; propylene glycol methyl ether acetate; dipropylene glycol methyl ether acetate; n-butanol; hexyl alcohol; hexyl acetate; methyl n-amyl ketone; butylene glycol; propylene glycol; diisobutyl ketone; methyl propyl ketone; methyl ethyl ketone; methyl isobutyl ketone; 2-ethoxyethyl acetate; t-butyl alcohol; amyl alcohol; 2-ethylhexyl alcohol; cyclohexanol; isopropyl alcohol; and similar organic solvents, and mixtures thereof.

A preferred volatile organic solvent is n-butanol because coating composition components are easily dispersed in n-butanol. Another preferred volatile organic solvent is ethylene glycol monobutyl ether, i.e., butyl cellosolve.

The carrier also can include a relatively low amount of a nonpolar organic solvent, such as up to about 10% by weight of the carrier, without adversely affecting a coating composition, either prior to or after curing. Exemplary nonpolar organic solvents include a chlorinated hydrocarbon, an aliphatic hydrocarbon, or an aromatic hydrocarbon, like toluene, ethylbenzene, benzene, xylene, mineral spirits, kerosene, naphtha, heptane, hexane, and combinations thereof.

The amount of carrier included in the coating composition is limited only by the desired, or necessary, rheological properties of a coating composition. Usually, a sufficient amount of carrier is included in a coating composition to provide a composition that can be processed easily, that can be applied to a metal substrate easily and uniformly, and that is sufficiently evaporated from a coating composition during cure within the desired cure time.

A carrier, therefore, is included in the composition in a sufficient amount to provide a coating composition including about 5% to about 60%, and preferably about 10% to about 50%, by weight of the nonvolatile material. To achieve the full advantage of the present invention, a waterborne coating composition includes about 15% to about 45% by weight of the nonvolatile material. The addition of optional fillers can increase the amount of nonvolatile material above about 60%.

Therefore, essentially any carrier comprising a major portion of water and a minor portion of volatile organic solvents is useful in the present coating composition as long as the carrier adequately disperses, emulsifies and/or solubilizes the composition components; is inert with respect to interacting with composition components and thereby adversely affecting the stability of the coating composition or the ability of the coating composition to effectively cure; and evaporates quickly, essentially entirely and relatively rapidly to provide a cured coating composition that inhibits the corrosion of a metal substrate, that does not adversely affect a food or beverage that contacts the cured coating composition, and that demonstrates sufficient physical properties, like adhesion and flexibility, for use as a coating on the interior or exterior of a container or a closure.

(e) Other Optional Ingredients

A coating composition of the present invention also can include other optional ingredients that do not adversely affect the coating composition or a cured coating composition resulting therefrom. Such optional ingredients are known in the art, and are included in a coating composition to enhance composition esthetics; to facilitate manufacturing, processing, handling, and application of the composition; and to further improve a particular functional property of a coating composition or a cured coating composition resulting therefrom.

Such optional ingredients include, for example, dyes, pigments, extenders, fillers, additional anticorrosion agents, flow control agents, thixotropic agents, dispersing agents, antioxidants, adhesion promoters light stabilizers, and mixtures thereof. A nonionic or an anionic surfactant is included in a coating composition to improve flow properties. A wax emulsion and/or dispersion of a synthetic lubricant is included to improve the slip properties of a cured coating composition. Each optional ingredient is included in a sufficient amount to serve its intended purpose, but not in such an amount to adversely affect a coating composition or a cured coating composition resulting therefrom.

A coating composition of the present invention is prepared by first preparing the water-dispersible polymer. The water-dispersible polymer preferably is prepared by simultaneously advancing the epoxy compound and reacting the epoxy compound with the linking compound. The resulting modified epoxy compound is reacted with acrylic monomers under free radical polymerization conditions to provide the water-dispersible polymer.

The water-dispersible polymer then is admixed with the fugitive base, curing agent, and carrier, i.e., water and volatile organic solvent. The carrier is present in a sufficient amount to adjust the amount of nonvolatile material in the coating composition to a predetermined level. Optional ingredients can be added to the coating composition either prior to or after the addition of the carrier.

To demonstrate a coating composition of the present invention, the following Examples and Comparative Examples were prepared, then applied to a metal substrate, and finally cured to provide a coated metal substrate. The coated metal substrates then were tested, comparatively, for use as a food or beverage container. The cured coatings were tested for an ability to inhibit corrosion of a metal substrate; for adhesion to the metal substrate; for chemical resistance; for flexibility; and for scratch and mar resistance. A composition of the present invention was compared to a commercial vinyl organosol composition (i.e., Comparative Example 1) that is widely used in coating metal substrates for food and beverage applications.

Comparative Example 1
Commercial Vinyl Organosol Composition

| Ingredient | % (by weight) | % (by weight NVM[1]) |
|---|---|---|
| Xylene | 29.45 | — |
| Diisobutyl Ketone | 13.77 | — |
| Diacetone Alcohol | 20.90 | — |
| Solution Vinyl[2] | 11.61 | 34.32 |
| Phenolic Resin[3] | 2.02 | 2.99 |
| Epoxy Resin[4] | 1.01 | 2.99 |
| Lubricant[5] | 1.31 | 0.77 |
| Vinyl Chloride Dispersion Resin[6] | 19.93 | 58.92 |

[1]NVM is nonvolatile material;
[2]UCAR Solution Vinyl VMCC, available as a 100% active material, from Union Carbide Corp., Danbury, CT;
[3]50% nonvolatile material;
[4]EPON 828, available as a 100% active material, from Shell Chemical Co., Houston, TX;
[5]POLYSPERSE ®, 20% active material; and
[6]OXY 1730, available as a 100% active material, from Occidental Chemical Co., Houston, TX.

The composition of Comparative Example 1 contains about 33.8% nonvolatile material.

Example 1

| Ingredient | % (by weight) | % (by weight NVM[1]) |
| --- | --- | --- |
| Water-Dispersible Polymer/Fugitive Base Solution[7] | 91.46 | 97.0 |
| Curing Agent[8] | 1.52 | 2.3 |
| Lubricant[9] | 0.92 | 0.7 |
| N-Butyl Alcohol | 1.22 | |
| Deionized Water | 4.88 | |

[7]Aqueous solution of water-dispersible polymer solubilized with dimethylethanolamine, 35% solids content, see Example 2;
[8]Phenolic resin, based on phenol and paraformaldehyde, 50% active; and
[9]MICHEM 160, Michelman Chemical Inc., Cincinnati, OH, a 25% active emulsion of carnauba wax.

The composition of Example 1 is a coating composition of the present invention containing about 33% nonvolatile material. The composition of Example 1 is prepared by simply admixing composition ingredients until homogeneous. The composition of Example 1 is based on the water-dispersible polymer prepared as set forth below in Example 2.

EXAMPLE 2

Water-Dispersible Polymer/Fugitive Base Solution

An epoxy compound, i.e., EPON 828, a digly-cidylether of bisphenol-A, (EEW 187, 180 pounds) was added to a nitrogen-blanketed reactor fitted with a reflux condenser. The epoxy compound was heated to about 170° F. to about 175° F., then a sufficient amount of bisphenol-A was added to the heated epoxy compound to provide an epoxy resin of EEW of about 3000 (e.g., about 99 pounds). In addition, 464 grams (g) of sorbic acid and 77g of a phosphonium salt catalyst (i.e., SHELL Catalyst 1201, available from Shell Chemical Co., Houston, Tex. were added to the reactor.

The resulting mixture was heated to 240° F. while maintaining a nitrogen blanket. After reaching 240° F., the mixture was allowed to cool to 100° F. An exothermic reaction raised the temperature to 270° F., and the temperature then was allowed to raise at the rate of about one to about one and one-half Fahrenheit degrees per minute by cooling the mixture until the temperature reached about 350° F. (peak temperature was about 365° F.). After the exotherm subsided, the mixture was held at about 350° F. to about 360° F., by heating, for about one hour. When the epoxy resin attained an EEW of greater than about 3000, butyl cellosolve (176 pounds) was added to the mixture, and the mixture was allowed to cool to about 250° F.

Then, n-butyl alcohol (32.8 pounds) was added to the mixture, and the resulting mixture was further cooled to 230° F. A premix of styrene (790g), ethyl acrylate (38.7 pounds), methyl methacrylate (11.6 pounds), acrylic acid (3,299g), and methacrylic acid (3,950g), and having an acid number of about 166, was prepared. Azobisisobutyronitrile initiator (464g) was added to the monomer premix, then the resulting acrylic monomer/initiator mixture was added to the reactor over a 90-minute time period, while maintaining a temperature of about 230° F. Residual amounts of acrylic monomers were flushed into the reaction vessel with 14.4 pounds of butyl cellosolve and held at about 230° F. for an additional 30 minutes.

Next, a premix of 201g of azobisisobutyronitrile and 402g of butyl cellosolve was added to the reactor, and the resulting mixture was held for an additional 30 minutes at about 230° F. This procedure was repeated two additional times to ensure that the acrylic monomers were polymerized.

The contents of the reactor then were cooled to about 220° F., followed by the addition of 4090g of deionized water. The contents of the reactor were cooled to 212° F., then a premix of water (4090g) and dimethylethanolamine (4090g) was added to the reactor. After a 10-minute hold, heated deionized water (262 pounds, 200° F.) was added to the reactor over a one-hour time period. The reaction product was allowed to cool to about 195° F. to about 200° F. during the water addition. Next, deionized water (135 pounds) was quickly added to cool the reaction product to about 105° F. The reaction product then was adjusted to the desired solids content by the addition of deionized water.

The polymer solution of Example 2 had a solids content of about 35i, by weight; a pH of about 7.25; a viscosity of 350 cps (centipoise) measured on a #3 spindle at 25° C. and 20 rpm; an acid number on solids of about 32.5, and a base number on solids of about 16.2. The water-dispersible polymer/fugitive base solution of Example 2 was used as the major component of the composition of Example 1.

The composition of Example 1 was applied to both sides of an aluminum substrate at a rate to provide about 5.2 to about 7 milligrams per square inch (msi) interior dry film weight and about 2.3 to about 2.8 msi exterior dry film weight. The composition of Example 1 was applied at a rate of about 150 feet per minute, and was cured at about 450° F. for about 11 seconds. The composition of Example 1 was easy to apply, exhibiting excellent flow, no foaming, no skinning, no significant solvent loss, and no apparent rise in viscosity after two hours. The cured coating composition exhibited excellent gloss.

The composition of Example 1 was compared to the composition of Comparative Example 2. Comparative Example 1 was used as a control. The composition of Comparative Example 2 was similar to the composition of Example 1, except sorbic acid was omitted from the composition of Example 2. The composition of Comparative Example 2, therefore, does not include a linking compound to covalently bond the epoxy portion of the polymer to the polymerized acrylic portion of the polymer.

In summary, Comparative Example 2 contains 97%, by weight of nonvolatile material, of an epoxy-acrylic dispersion. The epoxy-acrylic dispersion contains 33% nonvolatile material, and is based on an advanced epoxy resin, styrene, ethyl acrylate, methyl methacrylate, and methacrylic acid. The epoxy-acrylic dispersion of Comparative Example 2 is prepared in an essentially identical manner as Example 2, except that sorbic acid is omitted and the epoxy resin used in Comparative Example 2 is advanced prior to the synthesis, rather than as a first step of the synthesis. The composition of Comparative Example 2 contains the same curing agent and lubricant, in the same amounts, as Example 1; and contains 30% nonvolatile material.

The compositions of Example 1 and Comparative Examples 1 and 2 were applied to a metal substrate (e.g., an aluminum substrate), and then cured to provide a coated metal substrate. The coated metal substrates then were tested, comparatively, for use as the interior surface of a food or beverage container. As will be demonstrated more fully hereinafter, a cured coating composition resulting from curing a coating composition of the present invention is suitable as the interior or exterior coating of a metal container for food or beverages, or for a closure.

In particular, a coating composition of the present invention is applied to a metal substrate, then cured for a sufficient time at a sufficient temperature, such as for about 3 to about 5 minutes at about 350° F. to about 500° F., to provide an adherent cured coating composition on the metal substrate. The coated metal substrate then is shaped into a container or other metal article.

Therefore, the compositions of Example 1 and Comparative Examples 1 and 2 were individually applied to a clean, untreated aluminum substrate in a sufficient amount to provide a cured film thickness of about 0.1 mil. Each composition was reduced to a solids content of about 28% by weight with deionized water before applying the composition to the metal substrate. After individually applying a composition of Example 1 or a composition of Comparative Examples 1 and 2 to an aluminum substrate, the composition was cured through an HVHT coil oven at 450° F. for about 16 seconds. Each of the cured coating compositions had a smooth, glossy appearance and was defect free.

Table I summarizes the results of different tests performed on the cured coating compositions.

TABLE I

| | Comparative Tests | | | |
|---|---|---|---|---|
| Composition | Film Weight[1] | Pencil Hardness | WF[2] | WP(B/A)[3] | DOW (B/A) |
| Example 1 | 7.3 | 2H–3H | 0.3, 0.3 | 100/100 | 80/100 |
| Comparative Ex. 2 | 7.3 | 2H–3H | 0.3, 0.5 | 100/100 | 100/100 |
| Comparative Ex. 1 (control) | 7.2 | 2H | 0, 0 | 100/100 | 60/100 |

[1]In milligrams per square inch of substrate;
[2]A wet feathering (WF) test, the coated panels, after immersion in 150° F. water for 15 minutes, were tested for an ability to resist forming torn or protruding edges when a tab of the coated metal substrate is removed from the coated metal substrate, the test simulates removal of a tab from an easy-open aluminum can, 0 (best results) - -5 (worst results);
[3]B/A is blush/adhesion, 100 - excellent, 90 - good, 0 - total loss, WP is wet pasteurization, the coated substrate is tested after immersion in 180° F. water for 30 minutes. Dow refers to a standard test wherein the coated substrate is tested by immersing the coated aluminum substrate in a boiling aqueous solution including 1 weight % Dowfax 2A1 (an anionic surfactant) for 15 minutes, then testing for blush and adhesion.

The results summarized in Table I show that the composition of Example 1 has a better blush resistance than a presently used commercial composition (Comparative Example 1).

The compositions of Example 1 and Comparative Example 2 also were tested for process resistance. In these tests, liquids are placed in contact with the coated substrate for a predetermined period of time under different conditions, then the substrates are tested for resistance to the effects of these various liquids in an enamel rating test.

The enamel rating tests the continuity of a cured coating film applied to a can part, such as a can end or a can body. A can end or can body is formed after the metal substrate is coated. Therefore, the cured coating has been deformed during this manufacturing step. The data presented in Table II show that the enamel rating for a composition of the present invention (Example 1) is substantially better than the enamel rating of Comparative Example 2.

The enamel rating test measures the passage of current from an electrode through an electrolyte to the formed can part. The coating functions as an insulator, and, accordingly, no current flows if film continuity is perfect. The lower the milliamp reading, the more continuous the coating on the metal substrate. The data in Table II shows a relatively low milliamp reading for can parts coated with the composition of Example 1, therefore, showing good film continuity. The composition of Example 1 showed substantially better process resistance because of a better enamel rating.

TABLE II

| | Comparative Testing | |
|---|---|---|
| Test[1] | Example 1 | Comparative Example 2 |
| Coated substrate (as made) | 0.39 ± 0.29 | 1.68 ± 0.91 |
| After 5 minutes in boiling Dowfax 2A1 | 4.75 ± 1.76 | 10.62 ± 2.61 |
| 3 days @ 120° F. Diet Coke | 2.49 ± 1.25 | 6.65 ± 2.16 |
| 7 days @ 100° F. Diet Coke | — | 5.0 ± 2.53 |
| 3 days @ 120° F. Diet Sprite | 1.70 ± 0.97 | 4.48 ± 1.43 |

[1]All tests are enamel ratings, in milliamps. Tests were performed after subjecting a coated substrate to the indicated conditions.

In general, the composition of Example 1 demonstrates improved flexibility, adhesion, and enamel rating over the composition of Comparative Example 2. Example 1 also exhibited properties comparable to the presently used commercial vinyl organosol composition of Comparative Example 1. In addition, the compositions of the present invention exhibit an improved solids/viscosity relationship permitting the formulation of a high solids composition having an acceptable viscosity for handling and application. The present coating compositions, therefore, have exhibited coating properties at least equal to current commercial compositions for similar end uses.

The data summarized in Tables I and II illustrate that a coating composition of the present invention provides a cured coating composition useful as the interior or exterior coating of a food or beverage container, or a closure for a food product container. The present compositions demonstrate excellent blush resistance and excellent adhesion. The blush resistance test demonstrates the ability of a cured coating to resist attack by a hot detergent solution and other liquids. A coating composition for a metal container must demonstrate excellent adhesion and flexibility because metal containers are manufactured by first coating flat sheets of the metal substrate, then forming the coated sheets into a desired shape. Coatings having poor adhesion properties can separate from the metal substrate during the shaping process. A lack of adhesion, therefore, can adversely affect the ability of the cured coating composition to inhibit corrosion of the metal substrate. A present coating composition exhibits an excellent adhesion to a metal substrate, and, therefore, the coating composition can be applied to a metal substrate, cured, and the metal substrate subsequently can be deformed without adversely affecting continuity of the coating film.

The present coating compositions also provided a cured coating composition having excellent flexibility. Flexibility is an important property of a cured polymeric coating because the metal substrate is coated prior to stamping or otherwise shaping the metal substrate into a desired metal article, such as a metal container. The coated metal substrate undergoes severe deformations during the shaping process, and if a coating lacks sufficient flexibility, the coating can form cracks or fractures. Such cracks result in corrosion of the metal substrate because the aqueous contents of the container have greater access to the metal substrate. Metal substrates coated with a present coating composition were deformed into the shape of a metal can. No cracks or fractures were observed. In addition, as previously described, a cured coating provided by a coating composition of the present invention is sufficiently adherent to the metal substrate, and remains sufficiently adherent during processing into a metal article, and, therefore, further enhances corrosion inhibition.

The comparative tests illustrated in Tables I and II demonstrate that a cured coating composition of the present invention maintains adhesion to the metal substrate; is flexible; is sufficiently hard and, therefore, is scratch and mar resistant; resists blush; and resists chemical attack.

As an added advantage, a composition of the present invention can be cured over a relatively wide temperature range of about 350° F. to about 500° F., and over relatively wide time period of about 3 minutes to about 5 minutes, without adversely affecting the advantageous physical and chemical properties of the cured coating composition. A container manufacturer, therefore, does not have to design the coating process around the curing characteristics of the coating composition; nor does the coating manufacturer have to tailor the curing characteristics of the coating composition to a particular coating process. The present coating composition, therefore, has a more universal range of applications. Furthermore, the wide curing range and the chemical and physical properties demonstrated by the present coating compositions makes a waterborne coating composition useful for both the exterior and interior of can bodies and can ends. Conventionally, different coating compositions are used for the can body and can end, and for the exterior and interior of the container. This further expands the range of applications for the present composition.

Obviously, many modifications and variations of the invention as hereinbefore set forth can be made without departing from the spirit and scope thereof and, therefore, only such limitations should be imposed as are indicated by the appended claims.

What is claimed is:

1. A water-dispersible polymer having the structure

wherein E is an epoxy portion of the polymer having at least one epoxy group, A is a polymerized acrylic portion of the polymer, and L is a linking portion of the polymer which covalently links E to A, said polymer prepared from
    (a) an epoxy compound having about two epoxy groups;
    (b) a linking compound having
        (i) either conjugated carbon—carbon double bonds or a carbon—carbon triple bond, and
        (ii) a moiety capable of reacting with an epoxy group, said linking compound present in an amount of about 0.003% to about 2.5% by weight of the polymer and in an amount sufficient to react with at least 1% and up to about 25% of the epoxy groups provided by the epoxy compound; and
    (c) acrylic monomers, at least a portion of which are selected from the group consisting of an α,β-unsaturated carboxylic acid, acrylamide, methacrylamide, and mixtures thereof, to render the polymer water dispersible.

2. The polymer of claim 1 comprising about 5% to about 95% by weight of the epoxy portion E.

3. The polymer of claim 1 wherein the epoxy compound has an epoxy equivalent weight of about 180 to about 20,000.

4. The polymer of claim 1 wherein the epoxy compound comprises a polyether diepoxide prepared in a reaction between a bisphenol and a compound having about two epoxy groups.

5. The polymer of claim 1 wherein the linking compound contains conjugated carbon—carbon double bonds.

6. The polymer of claim 1 wherein the linking compound contains a carbon—carbon triple bond.

7. The polymer of claim 1 wherein the linking compound has the structure

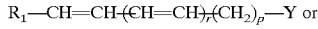
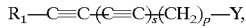

wherein $R_1$ is selected from the group consisting of hydrogen, phenyl, $C_1$–$C_{10}$ alkoxy-substituted phenyl, halo-substituted phenyl, $C_1$–$C_{18}$ alkyl-substituted phenyl, $C_1$–$C_{18}$ alkyl, $C_5$–$C_7$ cycloalkyl, phenyl-substituted $C_1$–$C_{18}$ alkyl, phenyl-substituted $C_{5-C7}$ cycloalkyl, halo-substituted $C_1$–$C_{18}$ alkyl, halo-substituted $C_5$–$C_7$ cycloalkyl, unsaturated $C_1$–$C_{18}$ aliphatic hydrocarbyl, and unsaturated $C_5$–$C_7$ cycloaliphatic hydrocarbyl; r is a numeral from 1 to 6; s is a numeral from 0 to 6; p is a numeral from 0 to 18; and Y is a moiety capable of reacting with an epoxy group.

8. The polymer of claim 7 wherein the Y group is selected from the group consisting of a carboxylic acid group; a hydroxyl group; an amino group —$N(R_2)_2$; an amido group —$CON(R_2)_2$, wherein $R_2$, independently, are hydrogen, $C_1$–$C_4$ alkyl, or phenyl; and a mercapto group —$SR_3$, wherein $R_3$ is hydrogen, $C_1$–$C_4$ alkyl, or phenyl.

9. The polymer of claim 1 wherein the linking compound is selected from the group consisting of sorbic acid, sorbic alcohol, a dicyclopentadiene acids, a conjugated unsaturated fatty acid, eleostearic acid, 3-pentyn-1-ol, 2-pentyn-1-ol, 4-pentynoic acid, 4-pentyn-1-ol, 4-pentyn-2-ol, 1-pentyn-3-ol, heptacose-10,12-diynoic acid, heptadeca-2,4-diynoic acid, heneicosa-2,4-diynoic acid, 2-heptynoic acid, 2-hexynoic acid, nonacosa-10,12-diynoic acid, nonadeca-1,4-diynoic acid, 2-nonynoic acid, pentadeca-2,4-diynoic acid, pentacosa-10,12-diynoic acid, phenylpropiolic acid, propiolic acid, tetrolic acid, tricosa-10,12-diynoic acid, 10-undecynoic acid, 1-butyn-3-ol, 2-butyn-1-ol, 3-butyn-1-ol, 2-decyn-1-ol, 3-decyn-1-ol, 3,6-dimethyl-1-heptyn-3-ol, 3,5-dimethyl-1-hexyn-3-ol, 3,4-dimethyl-1-pentyn-3-ol, 3-ethyl-1-heptyn-3-ol, 4-ethyl-1-hexyn-3-ol, 3-ethyl-5-methyl-1-heptyn-3-ol, 4-ethyl-1-octyn-3-ol, 3-ethyl-1-pentyn-3-ol, 1-ethynyl-1-cyclohexanol, 1-heptyn-3-ol, 2-heptyn-1-ol, 3-heptyn-1-ol, 4-heptyn-2-ol, 5-heptyn-3-ol, 1-hexyn-3-ol, 2-hexyn-1-ol, 3-hexyn-1-ol, 4-hexyn-2-ol, 5-hexyn-1-ol, 5-hexyn-3-ol, 3-methyl-1-butyn-3-ol, 5-methyl-1-hexyn-3-ol, 3-methyl-1-pentyn-3-ol, 3-nonyn-1-ol, 1-octyn-3-ol, 3-octyn-1-ol, 1-phenyl-2-propyn-1-ol, 2-propyn-1-ol, 10-undecyn-1-ol, 3-aminophenylacetylene, propargylamine, and mixtures thereof.

10. The polymer of claim 1 wherein the linking compound has a maximum of twelve carbon atoms.

11. The polymer of claim 1 wherein the polymerized acrylic portion A comprises at least 5%, by weight, of monomers capable of rendering the polymer water dispersible.

12. The polymer of claim 1 comprising about 0.25% to about 20%, by weight of the polymer, of monomers capable of rendering the polymer water dispersible.

13. The polymer of claim 1 wherein the α,β-unsaturated carboxylic acid is selected from the group consisting of acrylic acid, methacrylic acid, crotonic acid, itaconic acid, maleic acid, mesaconic acid, citraconic acid, sorbic acid, fumaric acid, and mixtures thereof.

14. The polymer of claim 1 wherein the polymerized acrylic portion A comprises 0% to about 95% of a vinyl monomer, an ester of an α,β-unsaturated acid, an acrylonitrile, or a mixtures thereof.

15. The polymer of claim 14 wherein the polymerized acrylic portion A comprises a monomer selected from the group consisting of styrene; a halostyrene; isoprene; a conjugated butadiene; α-methylstyrene; vinyl toluene; vinyl naphthalene; methyl acrylate; ethyl acrylate; propyl acrylate; isopropyl acrylate; butyl acrylate; isobutyl acrylate; pentyl acrylate; isoamyl acrylate; hexyl acrylate; ethylhexyl acrylate; lauryl acrylate; a $C_4$–$C_{12}$ alkyl acrylate; a $C_1$–$C_{12}$ alkyl methacrylate; a $C_1$–$C_{12}$ alkyl crotonate; dimethyl maleate; dibutyl fumarate; vinyl chloride; acrylonitrile; methacrylonitrile; vinyl acetate; vinyl propionate; vinyl stearate; and mixtures thereof.

16. The polymer of claim 1 wherein the epoxy portion E has the structure

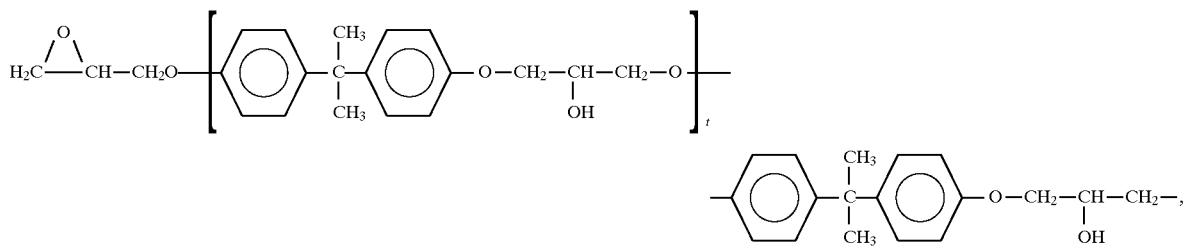

wherein t is 0 to about 70; the linking portion L comprises sorbic acid; and the polymerized acrylic portion A is predominantly acrylic acid, methacrylic acid, or a mixture thereof.

17. The polymer of claim 16 wherein the polymerized acrylic portion A further comprises a monomer selected from the group consisting of styrene, methyl acrylate, ethyl acrylate, butyl acrylate, methyl methacrylate, and mixtures thereof.

18. A water-dispersible polymer prepared by a method comprising:
(a) reacting (i) an epoxy compound having about two epoxy groups with (ii) a sufficient amount of a linking compound to consume at least 1% and up to about 25% of epoxy groups provided by the epoxy compound, said linking compound present in an amount of about 0.003% to about 2.5% by weight of the polymer, and having
(A) either conjugated carbon—carbon double bonds or a carbon—carbon triple bond, and
(B) a moiety capable of reacting with an epoxy group, to provide a modified epoxy compound having at least one epoxy group and wherein the linking compound is covalently bonded to the epoxy compound; and
(b) reacting the modified epoxy compound of step (a) with
(iii) a sufficient amount of acrylic monomers selected from the group consisting of an α,β-unsaturated carboxylic acid, acrylamide, methacrylamide, and mixtures thereof, such that the acrylic monomers copolymerize with the conjugated carbon—carbon double bonds or the carbon—carbon triple bond of the linking compound to provide the water-dispersible polymer.

19. The polymer of claim 1 wherein the linking compound L is sorbic acid, and the polymerized acrylic portion A is prepared from acrylic monomers selected from the group consisting of acrylic acid, methacrylic acid, styrene, ethyl acrylate, and methyl methacrylate.

* * * * *

UNITED STATES PATENT AND TRADEMARK OFFICE
CERTIFICATE OF CORRECTION

PATENT NO. : 5,830,952

DATED : November 3, 1998

INVENTOR(S) : Pedersen et al.

It is certified that error appears in the above-identified patent and that said Letters Patent is hereby corrected as shown below:

Column 1, line 49, "sub-strate" should be --substrate--

Column 2, line 14, "and-corrosion" should be --and corrosion--

Column 2, line 17, "over-come" should be --overcome--

Column 2, line 26, "inciner-ation" should be --incineration--

Column 3, line 11, "suffi-ciently" should be --sufficiently--

Column 3, line 15, "impossi-ble" should be --impossible--

Column 5, line 10, "through-out" should be --throughout--

Column 5, line 40, "divinyl-benzene" should be --divinylbenzene--

Column 8, line 57, "(Mw)" should be --$(M_w)$--

Column 13, line 42, "50" should be --5%--

Column 14, line 36, "4-pentynoicacid" should be --4-pentynoic acid--

UNITED STATES PATENT AND TRADEMARK OFFICE
CERTIFICATE OF CORRECTION

PATENT NO.   :  5,830,952
DATED        :  November 3, 1998
INVENTOR(S)  :  Pedersen et al.

It is certified that error appears in the above-identified patent and that said Letters Patent is hereby corrected as shown below:

Column 14, line 38, "diynoicacid" should be --diynoic acid--

Column 15, line 44, "di-carboxylic" should be --dicarboxylic--

Column 24, line 16, "35i" should be --35%--

Signed and Sealed this

Fourteenth Day of December, 1999

Attest:

Attesting Officer

Q. TODD DICKINSON

Acting Commissioner of Patents and Trademarks